US009621945B2

(12) United States Patent
Deng (10) Patent No.: US 9,621,945 B2
(45) Date of Patent: Apr. 11, 2017

(54) METHOD AND SYSTEM FOR CONTINUOUSLY PLAYING MEDIA RESOURCE IN DEVICE (71) Applicant: ZTE Corporation, Shenzhen, Guangdong (CN)

(72) Inventor: Xianlun Deng, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 14/761,932

(22) PCT Filed: Aug. 13, 2013

(86) PCT No.: PCT/CN2013/081401
§ 371 (c)(1),
(2) Date: Jul. 17, 2015

(87) PCT Pub. No.: WO2013/189334
PCT Pub. Date: Dec. 27, 2013

(65) Prior Publication Data
US 2015/0358670 A1 Dec. 10, 2015

(30) Foreign Application Priority Data
Jan. 22, 2013 (CN) .......................... 2013 1 0021576

(51) Int. Cl.
H04N 21/433 (2011.01)
H04N 21/436 (2011.01)
(Continued)

(52) U.S. Cl.
CPC ..... *H04N 21/4333* (2013.01); *H04N 21/2387* (2013.01); *H04N 21/25841* (2013.01);
(Continued)

(58) Field of Classification Search
None
See application file for complete search history.

(56) References Cited

U.S. PATENT DOCUMENTS

2008/0107405 A1    5/2008 Chen
2009/0204663 A1*   8/2009 Patwari .............. H04N 7/17318
                                                        709/203
(Continued)

FOREIGN PATENT DOCUMENTS

CN      101047846 A     10/2007
CN      101098452        1/2008
(Continued)

OTHER PUBLICATIONS

International Search Report in international application No. PCT/CN2013/081401, mailed on Nov. 7, 2013.
(Continued)

*Primary Examiner* — Ricky Chin
(74) *Attorney, Agent, or Firm* — Oppedahl Patent Law Firm LLC (57) ABSTRACT The disclosure discloses a method and system for continuously playing a media resource in a device. The method includes that a Digital Media Player (DMP) or a Digital Media Renderer (DMR) obtains breakpoint information corresponding a media resource before playing the media resource, wherein the breakpoint information includes a Message-Digest Algorithm 5 (MD5) value of the media resource, a unique device Identifier (ID) of the DMP or the DMR, and breakpoint time when the DMP or the DMR stops playing in the last playing process of the media resource; the DMP or the DMR sends to a Digital Media Server (DMS) according to the breakpoint information, a request for sending data of the media resource from a breakpoint; the DMP or the DMR obtains the data of the media resource from the DMS and plays the same. By means of the disclosure, DMPs/DMRs of different users are enabled to remember breakpoint information of a media resource to be played by (Continued)

each user when playing the same media resource on different DMSs and multi-breakpoint continuous playing can be supported. In addition, the breakpoint information of each user will not overlap each other.

8 Claims, 6 Drawing Sheets

(51) Int. Cl.
    *H04N 21/258*     (2011.01)
    *H04N 21/45*     (2011.01)
    *H04N 21/647*     (2011.01)
    *H04N 21/435*     (2011.01)
    *H04N 21/4363*     (2011.01)
    *H04N 21/41*     (2011.01)
    *H04N 21/2387*     (2011.01)

(52) U.S. Cl.
    CPC ..... *H04N 21/4113* (2013.01); *H04N 21/4126* (2013.01); *H04N 21/435* (2013.01); *H04N 21/436* (2013.01); *H04N 21/4363* (2013.01); *H04N 21/43615* (2013.01); *H04N 21/4524* (2013.01); *H04N 21/64707* (2013.01); *H04N 21/64746* (2013.01)

(56) References Cited

U.S. PATENT DOCUMENTS

2009/0241149 A1*   9/2009   Yoshioka ........... H04N 7/17318
                                                   725/87
2009/0300231 A1*   12/2009   Munetsugu ........ H04N 7/17318
                                                   710/33
2011/0307930 A1*   12/2011   Rouse ................ H04N 21/2387
                                                 725/98
2012/0042347 A1*   2/2012   Yasuda ............. H04N 21/2387
                                               725/89
2012/0072729 A1     3/2012   Winograd
2012/0072730 A1     3/2012   Winograd
2012/0072731 A1*   3/2012   Winograd ............... G06F 21/10
                                               713/176

FOREIGN PATENT DOCUMENTS

| | | |
|---|---|---|
| CN | 101741841 | 6/2010 |
| CN | 102187340 A | 9/2011 |
| CN | 102378059 A | 3/2012 |
| CN | 102523529 A | 6/2012 |
| CN | 102724196 A | 10/2012 |
| CN | 103065662 A | 4/2013 |
| JP | 2012108972 | 6/2012 |
| KR | 20120044082 A | 5/2012 |

OTHER PUBLICATIONS

English Translation of the Written Opinion of the International Search Authority in international application No. PCT/CN2013/081401, mailed on Nov. 7, 2013.

Supplementary European Search Report in European application No. 13807114.7, mailed on Dec. 3, 2015.

* cited by examiner

METHOD AND SYSTEM FOR CONTINUOUSLY PLAYING MEDIA RESOURCE IN DEVICE

TECHNICAL FIELD

The disclosure relates to the technical field of communications, and particularly to a method and system for continuously playing a media resource in a device.

BACKGROUND

With the continuous development of applications of the concept of digital homes, the good experience of Digital Living Network Alliance (DLNA) devices is undoubtedly a major selling point of the DLNA devices as devices directly oriented to users.

The DLNA devices include the following types: home network devices, mobile handheld devices, and interoperable home devices.

The home network devices include: Digital Media Servers (DMS), Digital Media Players (DMP), Digital Media Renderers (DMR), Digital Media Controllers (DMC) and Digital Media Printers (DMPr).

The mobile handheld devices include: Mobile DMSs (M-DMS), Mobile DMPs (M-DMP), Mobile Digital Uploaders (M-DMU), Mobile Digital Downloaders (M-DMD) and Mobile Digital Media Controllers (M-DMC).

The interoperable home devices include: Mobile Network Connectivity Functions (M-NCF) and Mobile Interoperability Units (MIU).

The DMSs may be any devices with a file storage function among DLNA interconnecting devices.

The DMPs may be any devices with a display function and an audio and video playing function among DLNA interconnecting devices.

The DMRs may be any devices with a function of decoding audio and video coding among DLNA interconnecting devices.

Three interaction methods for playing a media resource are stipulated in DLNA protocols.

1. A DMS may initiatively push a stored audio or video file to any DMR device to be played.

2. A DMP may initiatively search and select the audio or video file in the DMS so as to play the audio or video file.

3. A DMC may read an audio and video file list in the DMS and push the selected audio or video file to the DMR to be played.

In existing DLNA applications, an audio or video file in a DMS may be played in different DMPs or DMRs, and a breakpoint continuous playing function has been implemented in some environments for playing programs. However, a DMS may belong to a public device, and different DMPs/DMRs correspond to different holders. Therefore, a breakpoint may be overlapped if different DMP/DMR holders play the same video file in the DMS, and a video played continuously from a breakpoint by a DMP/DMR holder is not played from a breakpoint stored previously by the DMP/DMR holder. Similarly, a DMP/DMR, which is portable, may be connected to different DMSs in different environments. If users in a DMS need to play the same video, the DMP/DMR will fail to start a breakpoint continuous playing function, thereby resulting in bad user experience.

Therefore, it is urgent to provide a DLNA-based multi-breakpoint technology for continuous playing a media resource in a plurality of intelligent devices.

SUMMARY

A technical problem to be solved by embodiments of the disclosure is to provide a method and system for continuously playing a media resource in a device so as to solve the problem that multi-breakpoint continuous playing cannot be implemented for a media resource in a plurality of intelligent devices.

On one hand, an embodiment of the disclosure provides a method for continuously playing a media resource in a device to solve the technical problem, including that a DMP or a DMR obtains breakpoint information corresponding a media resource before playing the media resource, wherein the breakpoint information includes: a Message-Digest Algorithm 5 (MD5) value of the media resource, a unique device Identifier (ID) of the DMP or the DMR, and breakpoint time when the DMP or the DMR stops playing in the last playing process of the media resource;

the DMP or the DMR sends to a DMS according to the breakpoint information, a request for sending data of the media resource from a breakpoint;

the DMP or the DMR obtains the data of the media resource from the DMS, and plays the same.

Preferably, the method further includes that the DMS obtains the breakpoint information when the playing of the media resource is stopped during the process in which the DMP or the DMR plays the media resource, wherein the breakpoint information includes: the MD5 value of the media resource, the unique device ID of the DMP or the DMR, and the breakpoint time when the DMP or the DMR stops playing the media resource;

the DMS judges whether the DMS stores breakpoint information corresponding to the MD5 value of the media resource, or the unique device ID of the DMP or the DMR; and if so, updates the breakpoint information; otherwise creates the breakpoint information in the DMS.

Preferably, after the DMS updates or creates the breakpoint information, the method further includes that when the DMP or the DMR is provided with a storage function, the DMS sends to the DMP, breakpoint information corresponding to the DMP, or sends to the DMR, breakpoint information corresponding to the DMR; the DMP or the DMR judges, according to the unique device ID of the DMP/DMR and the MD5 value of the played media resource in the breakpoint information, whether the breakpoint information exists in the DMP or the DMR; and if so, updates the breakpoint information; otherwise, creates the breakpoint information.

Preferably, the operation that the DMP or the DMR obtains the breakpoint information before playing the media resource includes that the DMP or the DMR sends to the DMS, a data request and a request for obtaining the breakpoint information of the media resource;

when the DMS determines that the breakpoint information is not stored in the DMP or the DMR, the DMS judges whether the breakpoint information is stored in the DMS; and if so, sends to the DMP or the DMR, basic media information of the media resource and the breakpoint information; otherwise, sends to the DMR the data of the media resource from the start.

Preferably, the method further includes that when determining that the breakpoint information is stored in the DMP or the DMR, the DMS obtains the breakpoint information stored in the DMP or the DMR, and sends the basic media information of the media resource and the breakpoint information to the DMP or the DMR.

On the other hand, an embodiment of the disclosure further provides a system for continuously playing a media resource in a device, including: a DMS, a DMP or a DMR, wherein the DMP or the DMR is configured to obtain breakpoint information corresponding a media resource before playing the media resource; send to the DMS according to the breakpoint information, a request for sending data of the media resource from a breakpoint, and obtain the data of the media resource from the DMS and play the same;

the breakpoint information includes an MD5 value of the media resource, a unique device ID of the DMP or the DMR, and breakpoint time when the DMP or the DMR stops playing in the last playing process of the media resource;

the DMS is configured to receive from the DMP or the DMR, the request for sending the data of the media resource from the breakpoint.

Preferably, when the playing of the media resource is stopped during the process in which the DMP or the DMR plays the media resource, the DMS is further configured to obtain the breakpoint information;

the breakpoint information includes: the MD5 value of the media resource, the unique device ID of the DMP or the DMR, and the breakpoint time when the DMP or the DMR stops playing the media resource;

the DMS is further configured to judge whether the DMS stores breakpoint information corresponding to the MD5 value of the media resource, or the unique device ID of the DMP or the DMR; if so, update the breakpoint information; otherwise, create the breakpoint information.

Preferably, the DMS is further configured to, when the DMP or the DMR is provided with a storage function, send to the DMP, breakpoint information corresponding to the DMP, and send to the DMR, breakpoint information corresponding to the DMR;

the DMP or the DMR is further configured to judge, according to the unique device ID of the DMP/DMR and the MD5 value of the played media resource in the breakpoint information, whether the breakpoint information exists in the DMP or the DMR; if so, update the breakpoint information; otherwise, create the breakpoint information.

Preferably, the DMP or the DMR is further configured to send to the DMS, a data request and a request for obtaining the breakpoint information of the media resource;

the DMS is further configured to, when determining that the breakpoint information is not stored in the DMP or the DMR, judge whether the breakpoint information is stored in the DMS; if so, send to the DMP or the DMR basic media information of the media resource and the breakpoint information; otherwise, send to the DMR the data of the media resource from the start.

Preferably, the DMS is further configured to, when determining that the breakpoint information is stored in the DMP or the DMR, obtain the breakpoint information stored in the DMP or the DMR, and send the basic media information of the media resource and the breakpoint information to the DMP or the DMR.

The embodiments of the disclosure have the following beneficial effect:

By means of the embodiments of the disclosure, DMPs/DMRs of different users are enabled to remember breakpoint information of a media resource to be played by each user when playing the same media resource on different DMSs, and multi-breakpoint continuous playing can be supported. In addition, the breakpoint information of each user will not overlap each other.

DETAILED DESCRIPTION

The disclosure will be further expounded hereinafter in combination with the accompanying drawings and the embodiments. It should be understood that the specific embodiments described herein are only used for explaining the disclosure, but are not used for limiting the disclosure.

Figure 1:
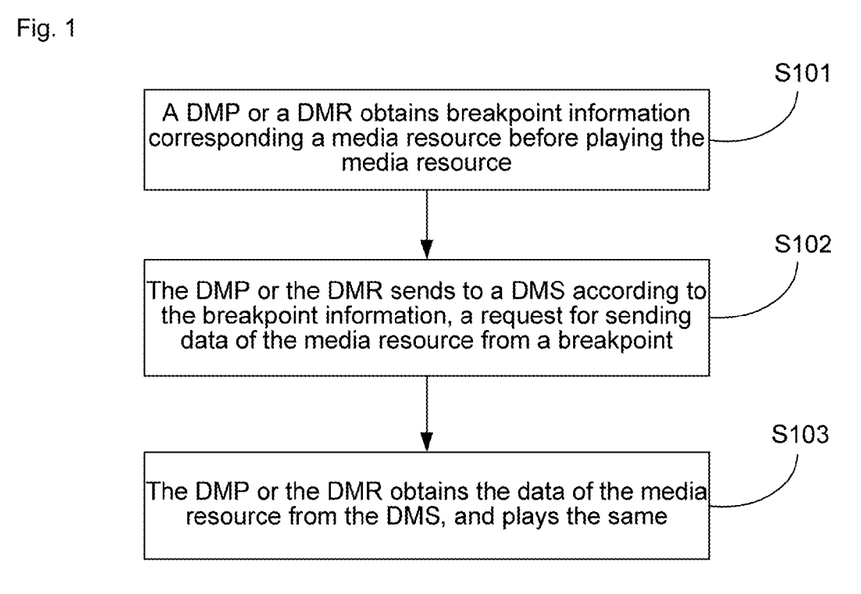
FIG. 1 is a flowchart of a method for continuously playing a media resource in a device according to an embodiment of the disclosure.

As shown in FIG. 1, an embodiment of the disclosure relates to a method for continuously playing a media resource in a device, including:

Step 101: A DMP or a DMR obtains breakpoint information corresponding a media resource before playing the media resource.

Here, the breakpoint information includes: an MD5 value of the media resource, a unique device ID of the DMP or the DMR, and breakpoint time when the DMP or the DMR stops playing in the last playing process of the media resource. Different media resources correspond to different MD5 values, thus a media resource that a user expects to play may be determined by an MD5 value. Different DMPs or DMRs correspond to different unique device IDs of the DMPs or the DMRs, thus a device expecting to play a media resource may be determined by a unique device ID of a DMP or a DMR. Therefore, breakpoint information of different DMPs or DMRs may be recorded when different DMPs or DMRs play the same media resource.

Step 102: The DMP or the DMR sends to a DMS according to the breakpoint information, a request for sending data of the media resource from a breakpoint.

Step 103: The DMP or the DMR obtains the data of the media resource from the DMS, and plays the same.

For example, a user uses a mobile phone to play a certain media resource on a Personal Computer (PC) at home. The user stops the playing or exits abnormally after playing the media resource for a period of time. At the moment, it is unnecessary for the user to play the media resource from the start when the user wants to play the same media resource after taking the mobile phone to another environment, such a house of a fiend, and when the same media resource is stored in a DMS, such as a PAD (a tablet computer or a palmtop) in the house of the fiend, thereby implementing a breakpoint continuous playing function according to breakpoint information stored in the mobile phone. For another example, breakpoint information of a user is recorded after the user plays a media resource in a DMS, such as a PC, by a mobile phone in a home environment. When another user of family members uses a PAD to also play the same media resource in the DMS, breakpoint information of the device will be remembered without interfering with the breakpoint information of the mobile phone, thus fully satisfying breakpoint continuous playing requirements of the family members.

Figure 2:
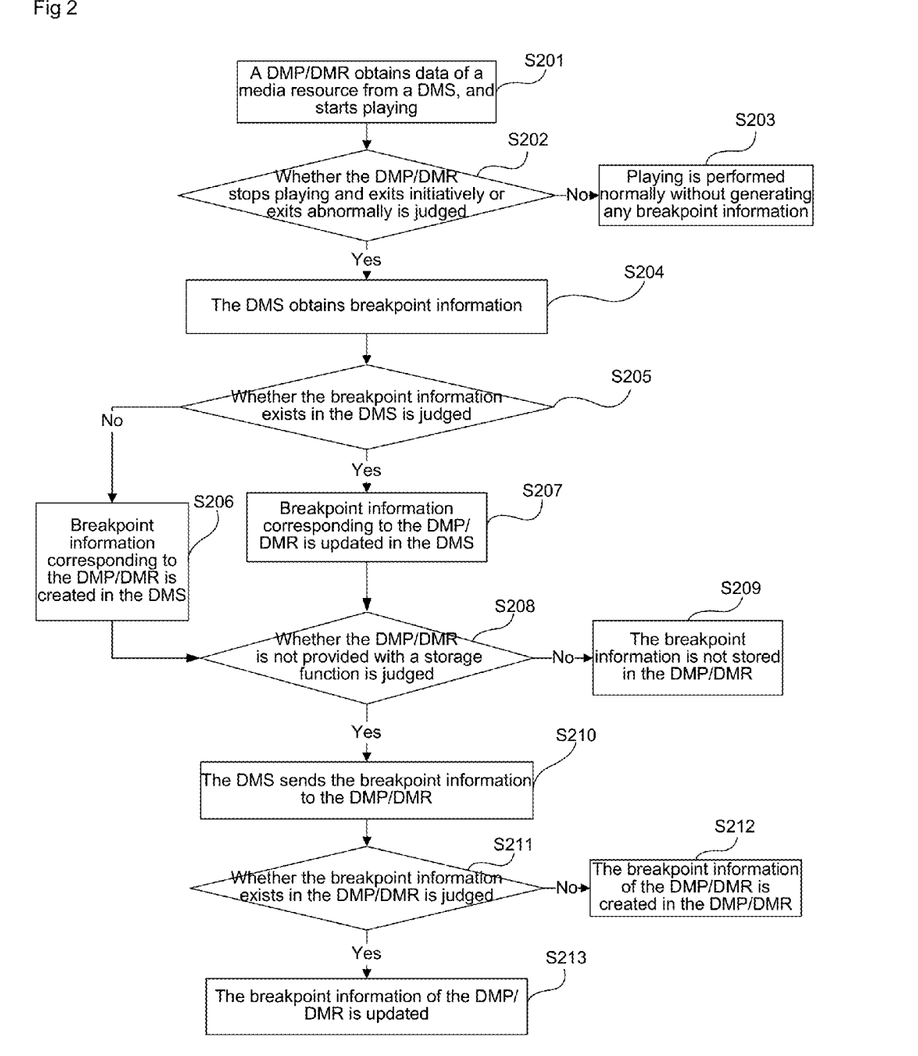
FIG. 2 is a flowchart of recording breakpoint information in a DMS and a DMP/DMR according to an embodiment of the disclosure.

FIG. 2 is a flowchart of recording breakpoint information in a DMS and a DMP/DMR according to an embodiment of the disclosure, including the following steps.

Step 201: A DMP/DMR obtains data of a media resource from a DMS, and starts playing.

Step 202: Whether the DMP/DMR stops playing and exits initiatively or exits abnormally is judged. If so, Step 204 is performed. Otherwise, Step 203 is performed.

Step 203: When the DMP/DMR does not initiatively stop a playing operation or does not exit abnormally at all, playing is performed normally without generating any breakpoint information.

Step 204: The DMS obtains breakpoint information and Step 205 is performed.

Here, the breakpoint information includes an MD5 value of the played media resource, breakpoint time and a unique device ID of the DMP/DMR. The played media resource may be determined uniquely through the MD5 value of the media resource while the DMP/DMR playing the media resource may be determined through the unique device ID of the DMP/DMR. The break point time records the time when the media resource is played when the DMP/DMR stops playing the media resource or exits abnormally.

Step 205: Whether the breakpoint information exists in the DMS is judged through the unique device ID of the DMP/DMR and the MD5 value of the played media resource in the breakpoint information in the DMS. If so, Step 207 is performed. Otherwise, Step 206 is performed.

Step 206: If the breakpoint information does not exist, breakpoint information corresponding to the DMP/DMR is created in the DMS and Step 208 is performed.

Step 207: If the breakpoint information exists, breakpoint information corresponding to the DMP/DMR is updated in the DMS.

Here, since the unique device ID of the DMP/DMR is the same as the DM5 value of the played media resource, the updating is equivalent to updating of the breakpoint time, and Step 208 is performed.

Step 208: Whether the DMP/DMR is provided with a storage function is judged. If so, Step 210 is performed. Otherwise, Step 209 is performed.

Step 209: If the DMP/DMR is not provided with a storage function, the breakpoint information is not stored in the DMP/DMR, and the process of recording the playing breakpoint information is terminated.

Step 210: If the DMP/DMR is provided with a storage function, the DMS sends the breakpoint information to the DMP/DMR.

Step 211: The DMP/DMR judges, according to the unique device ID of the DMP/DMR and the MD5 value of the played media resource in the breakpoint information, whether the breakpoint information exists in the DMP/DMR. If so, Step 213 is performed. Otherwise, Step 212 is performed.

Step 212: If the breakpoint information does not exist, the breakpoint information of the DMP/DMR is created in the DMP/DMR.

Step 213: If the breakpoint information exists, the breakpoint information of the DMP/DMR is updated in the DMP/DMR, that is, the breakpoint time is updated.

Figure 3:
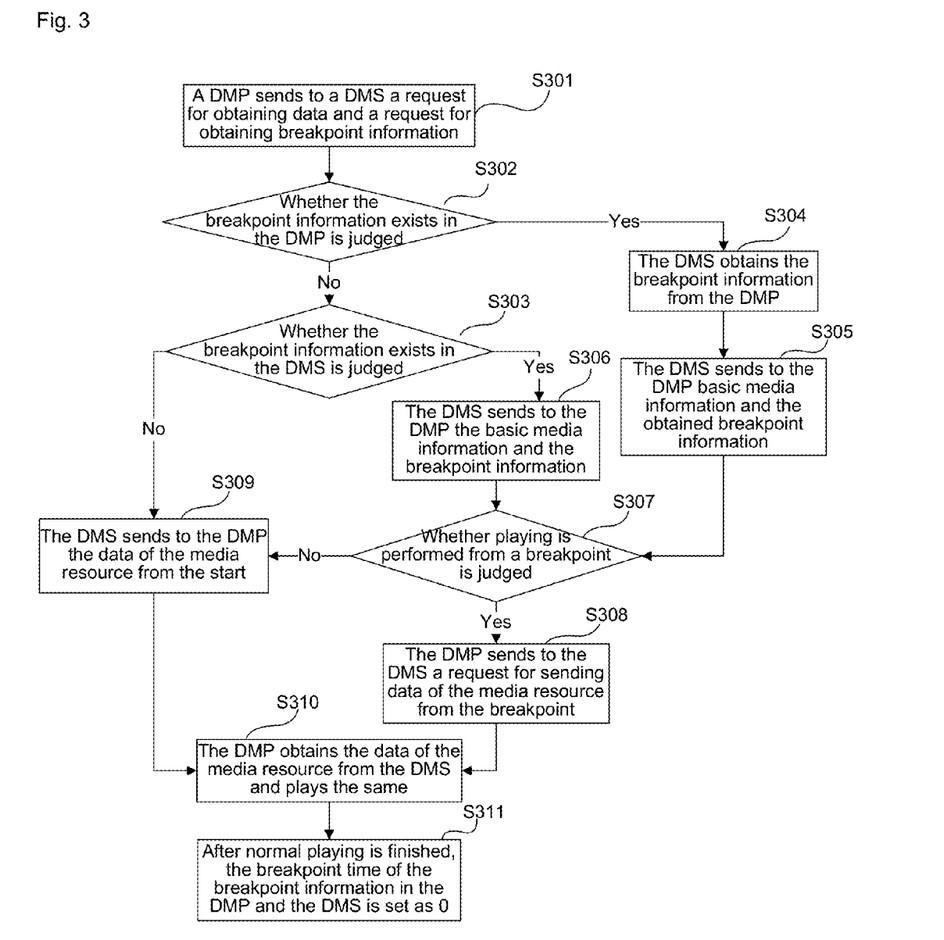
FIG. 3 is a flowchart of implementing breakpoint continuous playing when a DMP obtains data from a DMS initiatively according to an embodiment of the disclosure.

FIG. 3 expounds a process of implementing breakpoint continuous playing when a DMP obtains data from a DMS initiatively, including the following specific steps.

Step 301: When initiatively searching for a media resource file in a certain DMS, a DMP sends to a DMS a request for obtaining breakpoint information of a media resource while sending a request for obtaining data.

Step 302: The DMS judges whether the breakpoint information of the requested media resource exists in the DMP. If so, Step 304 is performed. Otherwise, Step 303 is performed.

Step 303: If the breakpoint information of the media resource does not exist in the DMP, searching is performed in the DMS, and whether the breakpoint information of the media resource requested by the DMP exists in the DMS is judged. If so, Step 306 is performed. Otherwise, Step 309 is performed.

Step 304: If the breakpoint information of the media resource exists in the DMP, the DMS obtains the breakpoint information from the DMP, and Step 305 is performed.

Step 305: The DMS sends to the DMP basic media information and the breakpoint information obtained from the DMP, and Step 307 is performed.

Step 306: If the breakpoint information of the media resource requested by the DMP exists in the DMS, the DMS sends to the DMP the basic media information and the breakpoint information and Step 307 is performed.

Step 307: The DMP inquires a user to judge whether the media resource is played from a breakpoint. If so, Step 308 is performed. Otherwise, Step 309 is performed.

Step 308: If the user chooses to perform playing from the breakpoint, the DMP sends to the DMS a request for sending the data of the media resource from the breakpoint and Step 310 is performed.

Step 309: When the breakpoint information is not obtained in the DMS or when the user selects to perform playing from the start, the DMP sends to the DMS a request to start sending data of the media resource from the start and Step 310 is performed.

Step 310: The DMP obtains the data of the media resource from the DMS and plays the same, and Step 311 is performed.

Step 311: After normal playing is finished, the breakpoint time of the breakpoint information in the DMP and the DMS is set as 0.

Figure 4:
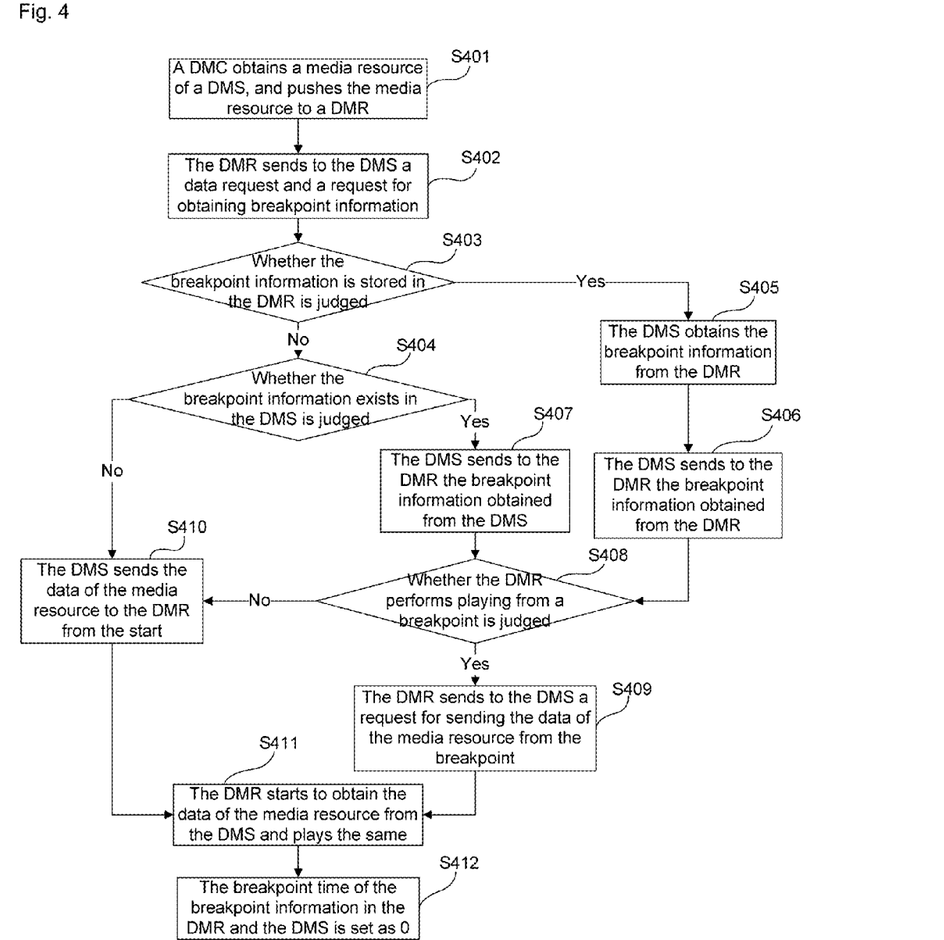
FIG. 4 is a flowchart of implementing breakpoint continuous playing when a DMC controls a DMR to obtain data of a DMS according to an embodiment of the disclosure.

FIG. 4 provides a detailed process of implementing breakpoint continuous playing when a DMC controls a DMR to obtain data of a DMS, specifically including the following steps.

Step 401: A DMC obtains a media resource of a DMS, and pushes the media resource to a DMR. That is, the DMC controls the DMR to obtain data of the DMS.

Step 402: When finishing loading basic information of the media resource, the DMR sends to the DMS a data request and a request for obtaining breakpoint information of the media resource.

Step 403: The DMS judges whether the breakpoint information of the media resource is stored in the DMR. If so, Step 405 is performed. Otherwise, Step 404 is performed.

Step 404: When the breakpoint information of the media resource does not exist in the DMR, the DMS is searched to judge whether the breakpoint information of the media resource requested by the DMR exists. If so, Step 407 is performed. Otherwise, Step 410 is performed.

Step 405: When the breakpoint information of the media resource exists in the DMR, the DMS obtains the breakpoint information from the DMR, and Step 406 is performed.

Step 406: The DMS sends to the DMR basic media information and the breakpoint information obtained from the DMR, and Step 408 is performed.

Step 407: When the breakpoint information of the media resource exists in the DMS, the DMS sends to the DMR the basic media information and the breakpoint information, and Step 408 is performed.

Step 408: The DMR inquires a user to judge whether the media resource is played from a breakpoint. If so, Step 409 is performed. Otherwise, Step 410 is performed.

Step 409: If the user chooses to play the media resource from the breakpoint, the DMR sends to the DMS a request for sending the data of the media resource from the breakpoint and Step 411 is performed.

Step 410: When the breakpoint information is not obtained from the DMS or when the user chooses to play the media resource from the start, the DMS sends the data of the media resource from the start to the DMR, and Step 411 is performed.

Step 411: The DMR starts to obtain the data of the media resource from the DMS and plays the same, and Step 412 is performed.

Step 412: After normal playing ends, the breakpoint time of the breakpoint information in the DMR and the DMS is set as 0.

Figure 5:
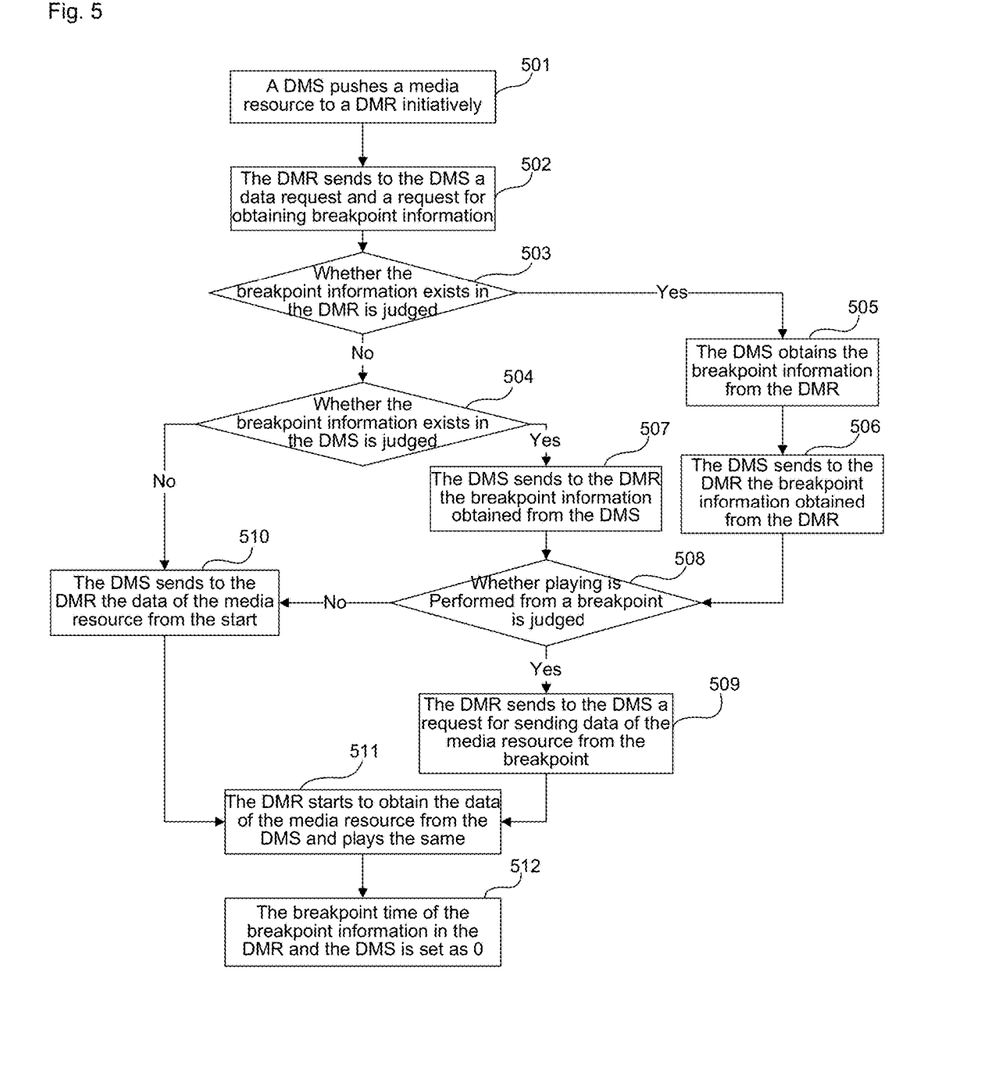
FIG. 5 is a flowchart of implementing breakpoint continuous playing when a DMS pushes data to a DMR initiatively according to an embodiment of the disclosure.

FIG. 5 provides a detailed process of implementing breakpoint continuous playing when a DMS pushes data to a DMR initiatively, specifically including the following steps.

Step 501: A DMS pushes a media resource to a DMR initiatively.

Step 502: When finishing loading basic information of the media resource, the DMR sends to the DMS a data request and a request for obtaining breakpoint information of the media resource.

Step 503: The DMS judges whether the breakpoint information of the media resource exists in the DMR. If so, Step 505 is performed. Otherwise, Step 504 is performed.

Step 504: When the breakpoint information of the media resource does not exist in the DMR, searching is performed in the DMS to judge whether the breakpoint information of the media resource requested by the DMR exists in the DMS. If so, Step 507 is performed. Otherwise, Step 510 is performed.

Step 505: When the breakpoint information of the media resource exists in the DMR, the DMS obtains the breakpoint information from the DMR and Step 506 is performed.

Step 506: The DMS sends to the DMR basic media information, and the breakpoint information obtained from the DMR.

Step 507: When the breakpoint information of the media resource exists in the DMS, the DMS sends to the DMR the basic media information and the breakpoint information, and Step 508 is performed.

Step 508: The DMR inquires a user to judge whether the media resource is played from a breakpoint. If so, Step 509 is performed. Otherwise, Step 510 is performed.

Step 509: When the user chooses to play the media resource from the breakpoint, the DMR sends to the DMS a request for sending data of the media resource from the breakpoint, and Step 511 is performed.

Step 510: When the breakpoint information is not obtained from the DMS, or when the user chooses to play the media resource from the start, the DMS sends to the DMR the data of the media resource from the start and Step 511 is performed.

Step 511: The DMR starts to obtain the data of the media resource from the DMS, and Step 512 is performed.

Step 512: After normal playing ends, the breakpoint time of the breakpoint information in the DMR and the DMS is set as 0.

Figure 6:
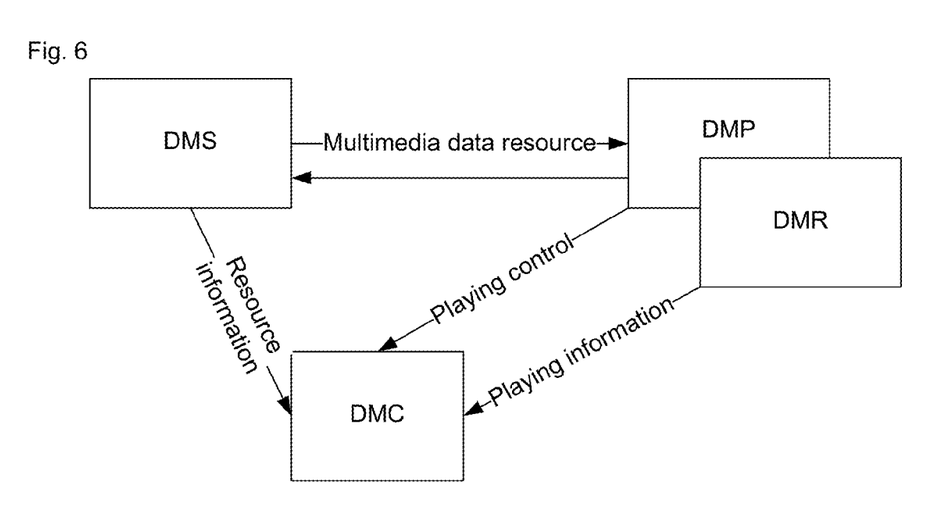
FIG. 6 is a schematic diagram of an interaction method of various DLNA devices involved in a system for continuously playing a media resource in a device according to an embodiment of the disclosure.

Besides, as shown in FIG. 6, an embodiment of the disclosure also relates to a system for continuously playing a media resource in a device so as to implement the foregoing method, including: a DMS, a DMP or a DMR, wherein the DMP or the DMR is configured to obtain breakpoint information corresponding a media resource before playing the media resource, wherein the breakpoint information includes an MD5 value of the media resource, a unique device ID of the DMP or the DMR, and breakpoint time when the DMP or the DMR stops playing in the last playing process of the media resource;

the DMP or the DMR is further configured to send to the DMS according to the breakpoint information, a request for sending data of the media resource from a breakpoint, and obtain the data of the media resource from the DMS and play the same;

wherein when the playing of the media resource is stopped during the process in which the DMP or the DMR plays the media resource, the DMS is further configured to obtain the breakpoint information, the breakpoint information includes: the MD5 value of the media resource, the unique device ID of the DMP or the DMR, and the breakpoint time when the DMP or the DMR stops playing the media resource.

The DMS is further configured to judge whether the DMS stores breakpoint information corresponding to the MD5 value of the media resource, or the unique device ID of the DMP or the DMR; if so, update the breakpoint information; otherwise, create the breakpoint information, wherein the DMS is further configured to, when the DMP or the DMR is provided with a storage function, send to the DMP, breakpoint information corresponding to the DMP, and send to the DMR, breakpoint information corresponding to the DMR;

the DMP or the DMR is further configured to judge, according to the unique device ID of the DMP/DMR and the MD5 value of the played media resource in the breakpoint information, whether the breakpoint information exists in the DMP or the DMR; if so, update the breakpoint information; otherwise, create the breakpoint information.

wherein the DMP or the DMR is further configured to send to the DMS, a data request and a request for obtaining the breakpoint information of the media resource;

the DMS is further configured to, when determining that the breakpoint information is not stored in the DMP or the DMR, judge whether the breakpoint information is stored in the DMS; if so, send to the DMP or the DMR basic media information of the media resource and the breakpoint information; otherwise, send to the DMR the data of the media resource from the start, wherein the DMS is further configured to, when determining that the breakpoint information is stored in the DMP or the DMR, obtain the breakpoint information stored in the DMP or the DMR, and send the basic media information of the media resource and the breakpoint information to the DMP or the DMR.

It may be seen from the foregoing embodiments that, by means of the embodiments of the disclosure, DMPs/DMRs of different users are enabled to remember breakpoint information of a media resource to be played by each user when playing the same media resource on different DMSs and multi-breakpoint continuous playing can be supported. In addition, the breakpoint information of each user will not overlap each other.

Although preferred embodiments of the disclosure have been disclosed for a purpose of illustration, those skilled in the art will realize that various improvements, additions and replacements are also possible. Therefore, the scope of the disclosure should not be limited to the foregoing embodiments.

What is claimed is:

1. A method for continuously playing a media resource in a device, wherein the method comprises:
    obtaining, by a Digital Media Player (DMP) or a Digital Media Renderer (DMR), breakpoint information corresponding to a media resource before playing the media resource;
    wherein the breakpoint information comprises: a Message-Digest Algorithm 5 (MD5) value of the media resource, a unique device Identifier (ID) of the DMP or the DMR, and breakpoint time when the DMP or the DMR stops playing in the last playing process of the media resource;
    sending, by the DMP or the DMR, a request for sending data of the media resource from the breakpoint time to a Digital Media Server (DMS) according to the breakpoint information;
    obtaining, by the DMP or the DMR, the data of the media resource from the DMS, and playing the data of the media resource obtained from the DMS;
    wherein the step of obtaining, by the DMP or the DMR, the breakpoint information before playing the media resource comprises:
    sending to the DMS, by the DMP or the DMR, a data request and a request for obtaining the breakpoint information of the media resource;
    when the DMS determines that the breakpoint information is not stored in the DMP or the DMR, determining, by the DMS, whether the breakpoint information is stored in the DMS: if so, sending to the DMP or the DMR, by the DMS, basic media information of the media resource and the breakpoint information; otherwise, sending to the DMR, by the DMS, the data of the media resource from the start.

2. The method according to claim 1, wherein the method further comprises: during the process in which the DMP or the DMR plays the media resource, obtaining, by the DMS, the breakpoint information when the playing of the media resource is stopped, wherein the breakpoint information comprises: the MD5 value of the media resource, the unique device ID of the DMP or the DMR, and the breakpoint time when the DMP or the DMR stops playing the media resource;
    determining, by the DMS, whether the DMS stores breakpoint information corresponding to the MD5 value of the media resource and the unique device ID of the DMP or the DMR; if so, updating, by the DMS, the breakpoint information; otherwise, creating, by the DMS, the breakpoint information.

3. The method according to claim 2, wherein after the DMS updates or creates the breakpoint information, the method further comprises:
    when the DMP or the DMR is provided with a storage function, sending to the DMP, by the DMS, breakpoint information corresponding to the DMP, or sending to the DMR, by the DMS, breakpoint information corresponding to the DMR;
    determining, by the DMP or the DMR, according to the unique device ID of the DMP/DMR and the MD5 value of the played media resource in the breakpoint information, whether the breakpoint information exists in the DMP or the DMR; if so, updating, by the DMP or the DMR, the breakpoint information; otherwise, creating, by the DMP or the DMR, the breakpoint information.

4. The method according to claim 1, wherein the method further comprises:
    when the DMS determines that the breakpoint information is stored in the DMP or the DMR, obtaining, by the DMS, the breakpoint information stored in the DMP or the DMR, and sending, by the DMS, the basic media information of the media resource and the breakpoint information to the DMP or the DMR.

5. A system for continuously playing a media resource in a device, wherein the system comprises: a Digital Media Server (DMS), a Digital Media Player (DMP) or a Digital Media Renderer (DMR), wherein
    the DMP comprises a first processor and a first memory, the first memory stores computer-readable instructions which when executed by the first processor implement the function of the DMP;
    the DMR comprises a second processor and a second memory, the second memory stores computer-readable instructions which when executed by the second processor implement the function of the DMR;
    the DMS comprises a third processor and a third memory, the third memory stores computer-readable instructions which when executed by the third processor implement the function of the DMS;
    the DMP or the DMR is configured to obtain breakpoint information corresponding to a media resource before playing the media resource; send to the DMS according to the breakpoint information, a request for sending data of the media resource from a breakpoint time, and obtain the data of the media resource from the DMS and play the data of the media resource obtained from the DMS;
    the breakpoint information comprises: a Message-Digest Algorithm 5 (MD5) value of the media resource, a unique device Identifier (ID) of the DMP or the DMR, and the breakpoint time when the DMP or the DMR stops playing in the last playing process of the media resource;
    the DMS is configured to receive from the DMP or the DMR, the request for sending the data of the media resource from the breakpoint time;
    the DMP or the DMR is further configured to send to the DMS, a data request and a request for obtaining the breakpoint information of the media resource;
    the DMS is further configured to, when determining that the breakpoint information is not stored in the DMP or the DMR, determine whether the breakpoint information is stored in the DMS: if so, send to the DMP or the DMR basic media information of the media resource and the breakpoint information: otherwise, send to the DMR the data of the media resource from the start.

6. The system according to claim 5, wherein when the playing of the media resource is stopped during the process in which the DMP or the DMR plays the media resource, the DMS is further configured to obtain the breakpoint information;

the breakpoint information comprises: the MD5 value of the media resource, the unique device ID of the DMP or the DMR, and the breakpoint time when the DMP or the DMR stops playing the media resource;

the DMS is further configured to determine whether the DMS stores breakpoint information corresponding to the MD5 value of the media resource and the unique device ID of the DMP or the DMR; if so, update the breakpoint information; otherwise, create the breakpoint information.

7. The system according to claim 6, wherein the DMS is further configured to, when the DMP or the DMR is provided with a storage function, send to the DMP, breakpoint information corresponding to the DMP, or send to the DMR, breakpoint information corresponding to the DMR;

the DMP or the DMR is further configured to determine, according to the unique device ID of the DMP/DMR and the MD5 value of the played media resource in the breakpoint information, whether the breakpoint information exists in the DMP or the DMR; if so, update the breakpoint information; otherwise, create the breakpoint information.

8. The system according to claim 5, wherein the DMS is further configured to, when determining that the breakpoint information is stored in the DMP or the DMR, obtain the breakpoint information stored in the DMP or the DMR, and send the basic media information of the media resource and the breakpoint information to the DMP or the DMR.

* * * * *